SOIL CONDITIONER AND A PROCESS FOR ITS PREPARATION

The invention relates to a freely flowing soil conditioner that consists of a granular perlite and to a process for its manufacture.

Perlite is lava stone which is reduced in size, ground and then heated to above 1,000° C. in a thermal process in order to form melt phases. In this way, water, which is locked into the perlite, evaporates and leads to swelling of the melt product. The swollen structure is preserved during cooling, such that the final product is a porous natural glass with a swollen structure which is commercially available as a granular material under the name perlite, particularly as a construction material or as an insulating material.

The swollen structure of the granular perlite exhibits a well-balanced ratio of closed-pore cells in the cellular structure, which function as capillaries. Granular perlite can therefore store relatively large quantities of water with the simultaneous maintenance of a relatively high quantity of water-free pores for air. The pores that store water in such a way that it is available to plants can, on the one hand, retain water against the force of gravity as a result of surface tension whereby on the other hand, however, the suction force exerted by the plant roots is so large that this suction force can withdraw water from the pores. The coarse pores, which are filled when the soil is completely saturated with water, cannot retain water against the force of gravity and accordingly provide air, which is required for aerating the soil, or oxygen, which is required for root respiration. In addition, granular perlite also has pores that bind water so strongly that it cannot be withdrawn by the suctional force of the roots.

Granular perlite thus has a well-balanced and favorable range of pore volume with regard to the pores that store water in such a way that it is available, and also the pores that store air, such that the proportion of these pores is relatively high in comparison to the ineffective fine pores that store dead water, which is water that is not available to plants. This particular property has led to the use of granular perlite as a physical soil conditioner. In this way, the high water storage capacity with a simultaneously high concentration of open pores ensures plants a uniform supply of water and air over extended periods of time. An essential feature is that water is released continuously and in a manner that is virtually independent of the external climatic conditions. It has been possible to establish that the formation of root tubercles and root hairs is increased as a result of the use of granular perlite. The low thermal conductivity of granular perlite brings about a high heat retention capacity and provides good climatic conditions in the soil. Since it is a natural product, granular perlite is biologically innocuous, environmentally friendly and free of fungi and bacteria that injure plants and animals; it is chemically neutral, compatible with virtually every type of soil, resistant to frost and resistant to temperatures up to 950° C.; granular perlite also regulates the supply of dissolved nutrients.

In addition to the use of the natural product in the pure state, its use is recommended as a rooting medium, in admixture with topsoil and peat or with all known mineral substrates and additives such that particularly the ability of soils to be rewetted is considerably improved. In this way, granular perlite permits the roots to obtain a constant adequate supply of oxygen and allows no excessive wetness to arise as a result of its high capacity to absorb water along with a simultaneously high concentration of open pores.

Granular perlite nevertheless has disadvantageous properties too. Granular perlite has a tendency to give off dust; its light color often acts disruptively, and its low weight makes handling difficult. In addition, a pH buffering capacity, which is highly desirable, is absent and granular perlite possesses no noteworthy cation-exchange capacity. These properties are ensured by some soil conditioners, but the favorable properties of granular perlite are missing in these soil conditioners.

A soil conditioner is known from DE-PS 3,817,276 which is particularly noted to improve the balance of nitrogen, phosphorus and potassium in the soil. For this purpose, it is proposed that molasses and its residues be used. Granular materials consisting of natural porous glasses have been proposed as the carrier for these substances including, among others, granular perlite whose free surface is coated with molasses and its residues. The use of the porous glasses is based on the objective of exploiting the high specific surface area as a coating surface that releases the substance used for the coating very slowly and in a controlled manner. The known agent can also be mixed with peat, humus, sand, clays, clay minerals, NPK fertilizers or mossy soil such that its properties as a soil conditioner are cumulative. Thus, in this case, the granular perlite serves only as an inert carrier and, as a result of the coating or surface deposition, largely loses the properties that were mentioned initially which serve to improve the soil physically.

Spraying a solution of water glass onto hot particles consisting of a porous material in order to provide a soil conditioner is also known from DE-PS 3,721,012. In this way, water is suddenly withdrawn from the water glass so that the water glass coagulates, as a result of which silicic acid is precipitated, which will act in a complex-forming and sorptive manner with the soil material. The known agent will form a replacement for partially destroyed clay materials in the intensive root layer. The proposal has been made to use granular perlite, among other materials, as the carrier for the water glass reaction product. In this case also, the soil-improving properties of granular perlite are canceled by the surface coating, especially when, as suggested, the surface is covered with additional revitalizing substances.

The task of the invention is to confer the additional and favorable properties of a soil conditioner on the granular perlite and, accordingly, to provide a freely flowable plant granular material for soil improvement in horticulture and agriculture which is suitable for use as a substrate for hydroponics in which the aforementioned disadvantages of granular perlite are obviated and which also exhibit a still higher available water capacity.

Within the framework of the invention, granular perlite is not misused as a carrier material, but the advantageous properties for improving the soil are retained such that the breadth of application of the soil conditioner is also expanded quite considerably.

It is known that substrates that are rich in clay minerals bind a portion of the water so firmly that this cannot be taken up by the plant roots. On the other hand, these substrates exhibit a high storage capacity for nutrients (cation-exchange capacity) and good buffering against variations in the pH value.

It is known from DE-PS 3,600,340 that porous soil conditioners, such as expanded clay and expanded shale, can store air and moisture in a way that makes them available to plants; however, siltation of the pores takes place with torrential rain, which occurs suddenly, as a result of the feature that the pores of the expanded clay and the expanded shale become mixed with the fine granular material of a

United States Patent [19]

Eder et al.

[11] Patent Number: 5,578,121
[45] Date of Patent: Nov. 26, 1996

[54] SOIL CONDITIONER AND A PROCESS FOR ITS PREPARATION

[75] Inventors: Gerhard Eder, Wiesbaden; Hans-Joachim Paul, Wertheim, both of Germany

[73] Assignee: Otavi Minen AG, Eschborn, Germany

[21] Appl. No.: 224,321

[22] Filed: Apr. 7, 1994

[30] Foreign Application Priority Data

Apr. 8, 1993 [DE] Germany .................. 43 11 636.1

[51] Int. Cl.$^6$ ...................................... C04B 14/04
[52] U.S. Cl. .................. 106/486; 106/DIG. 2; 106/487; 428/403; 428/404; 71/64.01; 71/64.02; 71/903
[58] Field of Search ...................... 428/384, 387, 428/403, 404, 402; 106/486, DIG. 2, 900, 487; 71/64.01, 64.02, 64.07, 64.08, DIG. 903; 501/141

[56] References Cited

U.S. PATENT DOCUMENTS

| 2,699,409 | 1/1955 | Hashimoto | 106/DIG. 2 |
| 3,030,218 | 4/1962 | Robinson | 106/DIG. 2 |
| 3,132,956 | 5/1964 | Lewis | 106/DIG. 2 |
| 3,203,813 | 8/1965 | Gajardo et al. | 106/DIG. 2 |
| 3,980,463 | 9/1976 | Muramoto et al. | 71/86 |
| 4,168,962 | 9/1979 | Lambeth | 71/31 |

FOREIGN PATENT DOCUMENTS

| 0835823 | 3/1970 | Canada | 106/DIG. 2 |
| 1253628 | 11/1967 | Germany | 106/DIG. 2 |
| 0088194 | 5/1983 | Japan | 71/64.07 |
| 1033486 | 8/1983 | U.S.S.R. | 106/DIG. 2 |
| 1044615 | 9/1983 | U.S.S.R. | 106/DIG. 2 |
| 2206340 | 1/1989 | United Kingdom | 106/900 |

OTHER PUBLICATIONS

Japanese Patent Abstract—"Fire Proof and Heat Insulating Coating Material" Karita et al. JP 05–43822 (Feb. 23, 1993).

Japanese Patent Abstact—"Soil Solidifying Agent", Noro et al. JP 05–32970 (Feb. 9, 1993).

Japanese Patent Abstract—"Production of Sound Absorbing Lightweight Ceramic Plate" JP 04–240168 (Aug. 27, 1992) Kubota et al.

Japanese Patent Abstract—"Heat Insulating Sprayed Material" Tezuka et al. JP 04–34298 (Feb. 5, 1992).

Japanese Patent Abstract "Production of Inorganic Decorative Sheet" Doi, JP 02–59482 (Feb. 28, 1990).

Japanese Patent Abstract—"Material for Processing used Jeans" Torada et al. JP 01–168904 (Jul. 4, 1989).

*Primary Examiner*—Paul Marcantoni
*Attorney, Agent, or Firm*—Jones & Askew

[57] ABSTRACT

The invention relates to a freely flowable, soil conditioner consisting of a granular perlite with a coating on the externally accessible surface of the perlite grains of unfired clay. The invention also relates to a process for the preparation of the soil conditioner in which a clay slurry is sprayed onto the perlite grains.

21 Claims, No Drawings

üls company. Polybutadiene, which is completely compatible with the environment, can either be added directly to the slurry or it can be injected in a second nozzle-type process after application of the clay. It is preferably added to the slurry, because one nozzle application process can be saved as a result. However, the consumption of polybutadiene, based on the clay content, can be reduced by using a second nozzle application process. Polybutadiene suppresses the tendency of the clay to decant. In this connection, attention has to be paid to the feature that quantities of additives up to approximately 3 g/L of granular material intensify decantation and bring about a significant improvement in clay adhesion only in the range above 3 g/L. The addition of the polybutadiene has only a negligible effect on the other properties of the product according to the invention. The air capacity is reduced only marginally and remains in the optimal region. The available water capacity is reduced only insignificantly, too, so that both positive properties of the soil conditioner are maintained. Therefore, in order to increase its resistance to being decanted, the clay can be bound firmly to the surface of granular perlite with a fixing agent, which is water-insoluble and retains the clay particles. Furthermore, the clay can be bound to the surface of the granular perlite through a water-insoluble network comprising a polymer operative to bind the clay particles. On using a fixing agent, the quantity of clay, which improves the properties of the granular perlite, can be increased so that not only is the surface covered but a sheath is even formed around the granular perlite, the thickness of which can be varied so that different quantities of sheathing clay or clay that does not cover the surface can be made available.

In the same way, a ketone-formaldehyde in combination with cellulose esters (trade name: Lipaton) is also suitable. Gelatin is also usable. In addition, the use of carboxymethylcelluloses showed good results as was the case with other known dispersion agents.

Depending on the clay which is used, the color of the product according to the invention varies and depends on the natural color of the clay. These colors range from ocher through light brown to dark brown. Slightly red clays also occur in nature. If a more distinct coloration should be desired for particular applications, then fine colored pigment such as iron oxide can be used for dyeing the granular material; these pigments can be added to the clay slurry in the most finely divided form. As a rule, a quantity of 0.5–5 wt % based on the clay content is adequate in order to achieve good dying.

The clay also increases the specific gravity of the granular perlite which can, if required, be an advantage if it is to be exposed to weathering, for example. An excess of clay is not harmful and can lead to an additional aggregating action and, as a result, the breadth of application of the agent is widened still further. It is surprising in this connection that even excess quantities do not adversely affect the properties of the perlite with regard to water storage and air pores.

Although perlite is virtually pH neutral, it nevertheless exhibits a slightly acidic pH value. For some applications, a soil conditioner pH value of more than 7 is advantageous. According to the invention, the pH value of the perlite is increased by covering the surface with clay with the extensive maintenance of its advantageous properties as a soil conditioner.

As is known, clay can also be used as a soil conditioner in which, in particular, its cation-exchange action with the soil material and its pH buffering action are exploited. The pH value of clays suitable for the invention is weakly acidic. It is therefore surprising that the use of clay can serve to increase the pH value of the perlite. In this connection, the important properties of the clay in regard to improving the soil, namely its cation-exchange capacity and its pH buffering capacity, are not removed with the relatively small quantity of clay so that the clay is available in this connection as a soil conditioner even though it is available only in small quantities.

The quality of the soil conditioner according to the invention, which is freely flowable and is made of a granular perlite whose granules are coated with clay on the surfaces that are externally accessible, can be improved according to a further form of embodiment of the invention with regard to the weight, the ease of decanting the clay, and the fixation of further additively working quantities of clay in a very simple manner, without the desired favorable properties which have been described for the new soil conditioner being adversely affected.

The freely flowable soil conditioner which is capable of flowing freely according to the invention, which consists only of granular material whose granules have been coated on the surface with unfired clay, has a pH value between 6.5 and 7.5. The bulk density lies between about 150 and 250 g/L which is, in this regard, essentially independent of the clay content.

In order to increase the weight for particular applications, a granular pumice can, for example, be added to the granular perlite, with approximately the same grain sizes and the same grain distribution, prior to treatment with the clay slurry. The amount of the granular pumice to be added is governed by the desired bulk density or the dry density of the raw product or, as the as the case may be, the weight per liter of the soil conditioner which can, in this way, be brought up to, for example, more than 250 or, in particular, about 350 g/L and more. A granular pumice with a grain size of 0 to 4 or, especially, 1–3 mm is preferably used. The granules of the granular pumice are also coated with unfired clay on their surface. However, the adhesion of the clay is not as good as on the granular perlite, so this method of increasing the weight of the soil conditioner by the addition of granular pumice is subject to limits where maintenance of a low ability to be decanted is important.

For example, good soil conditioners can be prepared from the following mixtures:

10–50 vol % of granular pumice (grain size 0–4 or, preferably, 1–3 mm);

50–90 vol % of granular perlite (grain size 0–6 or, preferably, 2–5 mm);

30–500 g of clay per liter of pumice/perlite (in the form of clay slurries with 30–50 wt % of clay and 70–50 wt % of water);

0–10 wt % of clay fluidizer based on the clay content;

0–5 wt % of coloring pigment based on the clay content; and, if required, humic acids.

This granular pumice increases the bulk density from, for example, 250 g/L to more than 350 through about 900 g/L. A further advantage for the soil conditioner which emerges with the addition of granular pumice is that the pH value can be adjusted to 5 through about 8, depending on the quantity of granular pumice. This possibility of pH control widens the breadth of application of the soil conditioner according to the invention according to the usage conditions in which particular pH values are desired which are in the indicated range.

An essential aspect is that the granular material does not adversely influence the other favorable properties of the granular perlite that has been coated with clay. Instead of pumice, another expedient, appropriately porous mineral granular material, for example, tuff or a similar material can also be used which appropriately increases the bulk density.

A further special method that can be imagined for increasing the weight of the soil conditioner according to the invention is to add fine perlite, with a grain size below, for example, 40 μm or, preferably, below 32 μm, to the clay suspension, or it is especially expedient to mix it in dry form with the granular perlite that has been covered with the clay suspension such that the fine perlite particles penetrate at least partially, or in a way that depends on its partial quantity, into the still fresh, moist clay layer and in this way adsorb water and produce the free flowing capability of the granular material. As a rule, fine perlite is a waste product which is produced during thermal expansion, and it accordingly consists of expanded perlite.

Depending on the quantity of the fine perlite added, the bulk density of the final product can readily be adjusted to above 250 g/L to, for example, 350 g/L and more. Exact data concerning the quantity of the addition cannot be given; depending on the intended application of the soil conditioner, the optimal quantity of the addition has to be ascertained for a particular bulk density. In this regard, for example, the weight ratio of clay to fine perlite can amount to approximately 4:1 through approximately 1.5:1.

Being a material that is similar to a granular perlite, the fine perlite does not worsen the good soil-improving properties of the soil conditioner according to the invention.

A special further advantage is achieved if, as has already been indicated, the fine perlite is mixed in after applying the clay slurry. The fine perlite particles are strongly hygroscopic and, on coming into contact with the granular material, adsorb water from, for example, the clay layer and the granular perlite in such a way that the free flowing capability of the soil conditioner according to the invention can be achieved without additional drying. The water that is adsorbed by the fine perlite particles and remains in the particles is not harmful; it even contributes, rather, to increasing, according to its partial quantity, the water that is available to plants and brings about an increase in the bulk density of the granular material by increasing the wet density of the fine perlite.

Dry fine perlite can also be added to an intermediate product that has already been added to the granular pumice. In this case, likewise, the bulk density is not only increased further in combination with the granular pumice, but the water adsorption of the fine perlite particles is utilized in order, without drying, to adjust the free flowing capacity of the soil conditioner.

In the indicated grain size range of 0–40 μm or, especially, 0–32 μm, the fine perlite, which is especially suitable as an additive, ought to have a bulk density of 70–140 g/L, a compacted density of 100–200 g/L and a wet density of 300–400 g/L. The action of the fine perlite depends, in essence, on the feature that the weight of the fine perlite can be approximately tripled as a result of the adsorption of water. Since the fine perlite retains the adsorbed water in the soil conditioner according to the invention and, as a result, ensures a granular material that is capable of flowing freely, not only can the weight be increased by the addition of the fine perlite, but also a free flowing capacity can be ensured.

According to this form of embodiment of the invention, the clay coating on the granular material thus contains fine perlite particles in a predetermined quantity in order to increase the bulk density of the soil conditioner and to ensure an adequate free flowing capability without drying the product. Thus the soil conditioner possesses, as such, the favorable soil-improving properties that have been described. However, in a further form of embodiment according to the invention, it can also be coated with significantly more clay, as a result of which it is contacted not once but many times, as described, first with the clay slurry and then with the fine perlite. Correspondingly more clay/fine perlite layers that adhere to one another are arranged on the granular perlite in this way; a freely flowable soil conditioner that contains considerably higher quantities of clay can thus be produced without drying. Surprisingly, these additional layers do not worsen the desired soil improving-properties that have been described; rather, the known favorable soil-improving properties of unfired clay are obtained in proportion to the magnitude of the addition.

The use of fine perlite also offers a further special advantage. If the product that contains fine perlite particles is subjected to heat at a temperature in the range from, for example, 200°–650° C. or, especially, between 350° and 450° C. then reactions take place, in particular, in the coating. One has not yet explained what the nature of the reactions is. Very probably, perlite melt phases arise which make the clay particles adhere; the clay is also possibly calcined and releases at least partially the physically and chemically bound water such that, at the same time, reactions between fine perlite particles, which are possibly already melting, and the clay particles take place. As a result, the heat treatment leads to an especially high resistance to decantation in regard to the clay and increased grain stability and an increased abrasion resistance for the granular material. Moreover, this treatment does not change the desired soil-improving properties that have been described in regard to the soil conditioner especially with regard to the availability of water and the availability of air and its cation-exchange capacity.

The heat treatment leads, in particular, to a soil conditioner that is resistant to decantation and is resistant to abrasion, especially with products with an increased concentration of clay that has been applied in layers.

The addition of fine perlite thus produces a multiplicity of unexpected improvements that were not automatically foreseeable; it solves, to a partial extent, disposal problems in factories that formerly had to dispose of fine perlite.

Using the following examples, one can see the simple way in which the soil conditioner according to the invention, which contains fine perlite, can be manufactured.

Using a 40-L shaft mixer, granular perlite with a grain size of 0–6 mm is premixed with 10 L of pumice with a grain size of 1–3 mm. 13 kg of slurry consisting of 30 wt % of clay and 70 wt % of water are then injected by nozzle into the mixer. After that, 18 L of fine perlite with a grain size such that 99% are >32 μm are added to the mixer. After a short mixing period, during which the fine perlite particles are pressed into the clay layer, a freely flowable granular material is formed that is an excellent soil conditioner.

Particularly in order to increase its resistance to being decanted, part of the granular material that is obtained in this way is added to a so-called calcination drum in which it is treated with heat at 350° C. so that a dry material arises which is resistant to being decanted and abraded and which has a bulk density of approximately 350 g/L.

Instead of fine perlite, use can also be made of a fine mineral product which acts in a similar way, for example, one consisting of vermiculite, glass dust, foam glass or similar materials, which increase, in a corresponding way, its bulk density and/or capacity to flow freely and/or increase its resistance to being decanted.

Based on the invention, a new soil conditioner is thus available on the basis of granular perlite with improved properties of the granular perlite. The unfired clay that covers the surface of the granular perlite confers on the granular perlite the properties that have been described on the basis of a surface coating and which are superior in comparison to the untreated granular perlite.

We claim:

1. A freely flowable soil conditioner consisting essentially of an unfired clay coating on the external surface of granular perlite.

2. A soil conditioner according to claim 1, wherein the clay is present in a quantity of 30–500 g/L of granular perlite.

3. A soil conditioner according to claim 1, wherein the clay contains montmorillonite.

4. A soil conditioner according to claim 1, wherein the granular perlite is present in a grain size of 2–5 mm.

5. A soil conditioner according to claim 1, wherein the clay contains a colored pigment.

6. A soil conditioner according to claim 1, wherein in order to increase its resistance to being decanted, the clay is bound firmly to the surface of the granular perlite with a fixing agent that is water-insoluble and retains the clay particles.

7. A soil conditioner according to claim 6, wherein the clay is firmly bound to the surface of the granular perlite through a water-insoluble network comprising a polymer operative to bind the clay particles.

8. A soil conditioner according to claim 6, wherein the fixing agent is applied to the clay layer.

9. A soil conditioner according to claim 6, wherein the fixing agent is contained in the clay layer.

10. A soil conditioner according to claim 7, wherein the fixing agent is polybutadiene in a quantity of more than 3 g/L of granular perlite.

11. A soil conditioner according to claim 1, wherein the clay is firmly bound to the surface of the granular perlite with a ketone-formaldehyde in combination with cellulose esters.

12. A soil conditioner according to claim 1, wherein the clay is firmly bound to the surface of the granular perlite with an agent that contains gelatin.

13. A conditioner according to claim 1, wherein the soil conditioner has pumice granules whose externally accessible surface is also coated with unfired clay in order to increase its bulk density.

14. A soil conditioner according to claim 13, wherein the granular pumice is present in a grain size of up to 4 mm.

15. A soil conditioner according to claim 13, wherein the soil conditioner has 10–50 vol % of granular pumice and 50–90 vol % of granular perlite.

16. A soil conditioner according to claim 1, wherein the soil conditioner has a pH value between 5 and 8.

17. A soil conditioner according to claim 1, wherein in or on the coating, the soil conditioner has hydrated fine perlite particles with particle sizes <40 μm and in quantities that on the basis of the absorbed water have a wet density that produces an increase in the bulk density of the soil conditioner.

18. A soil conditioner according to claim 17, wherein the fine perlite has a dry density of 70–140 g/L, a compacted density of 100–200 g/L and a wet density of 300–400 g/L.

19. A soil conditioner according to claim 17, wherein the fine perlite is present in a ratio by weight of clay to fine perlite of 4:1 to 1.5:1.

20. A soil conditioner according to claim 1, wherein the soil conditioner has more than one coated layer consisting of clay and fine perlite.

21. A soil conditioner according to claim 13, wherein the coating is dehydrated and calcined.

* * * * *